United States Patent [19]
Vigneri

[11] 3,864,987
[45] Feb. 11, 1975

[54] CHANGE SPEED GEARING

[76] Inventor: Guiseppe Vigneri, 102 Warwick St., Newark, N.J. 07105

[22] Filed: Oct. 11, 1973

[21] Appl. No.: 405,642

[52] U.S. Cl. ................................ 74/354, 74/665 B
[51] Int. Cl. .............................................. F16h 3/34
[58] Field of Search .......... 74/325, 665 B, 665 GA, 74/354

[56] References Cited
UNITED STATES PATENTS
3,564,935   2/1971   Vigneri ................................. 74/354

*Primary Examiner*—Samuel Scott
*Assistant Examiner*—Frank H. McKenzie, Jr.
*Attorney, Agent, or Firm*—Victor J. Evans & Co.

[57] ABSTRACT

A change speed gearing that includes an input or drive shaft together with means for rotating the drive shaft, as well as output shaft means, and intermeshing gears for operatively connecting the output shaft means to the input or drive shaft.

7 Claims, 6 Drawing Figures

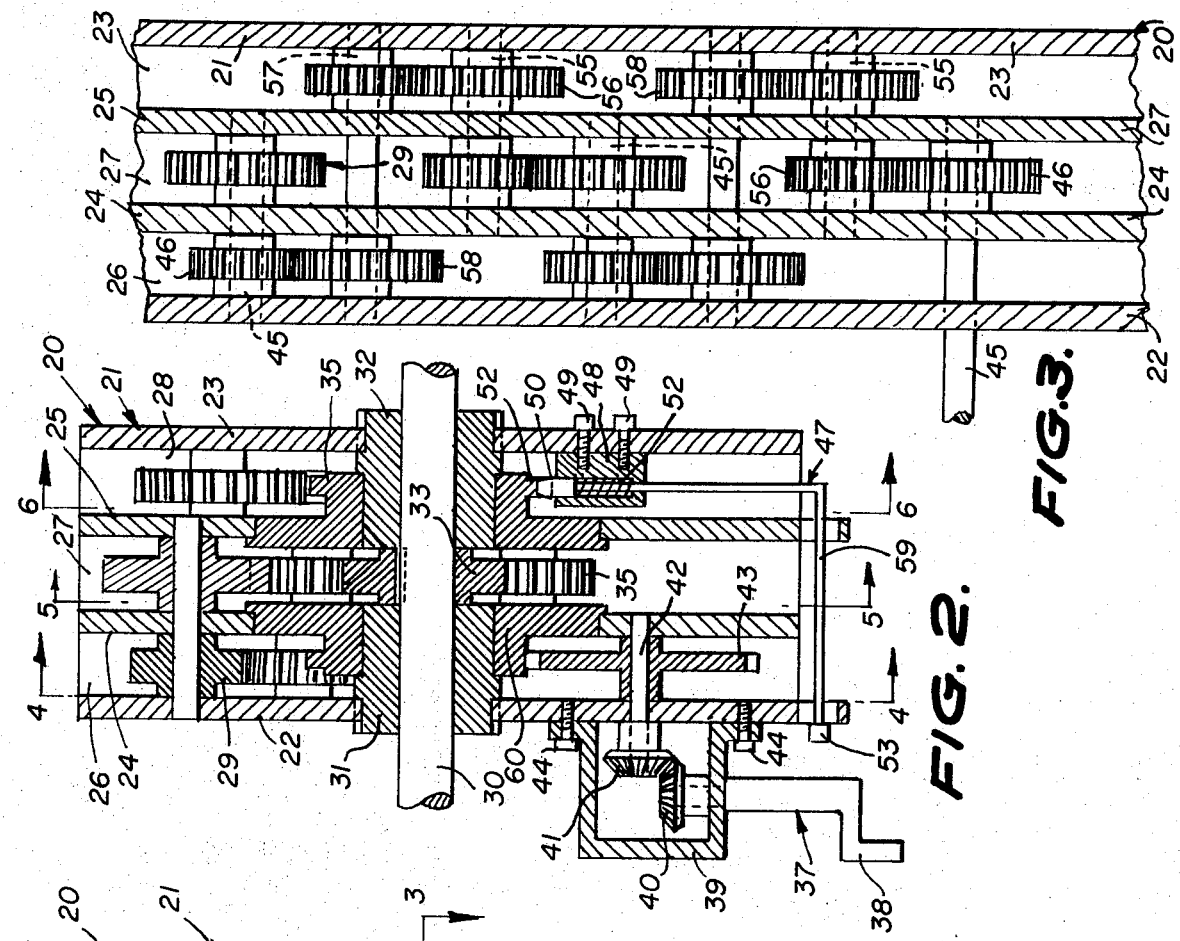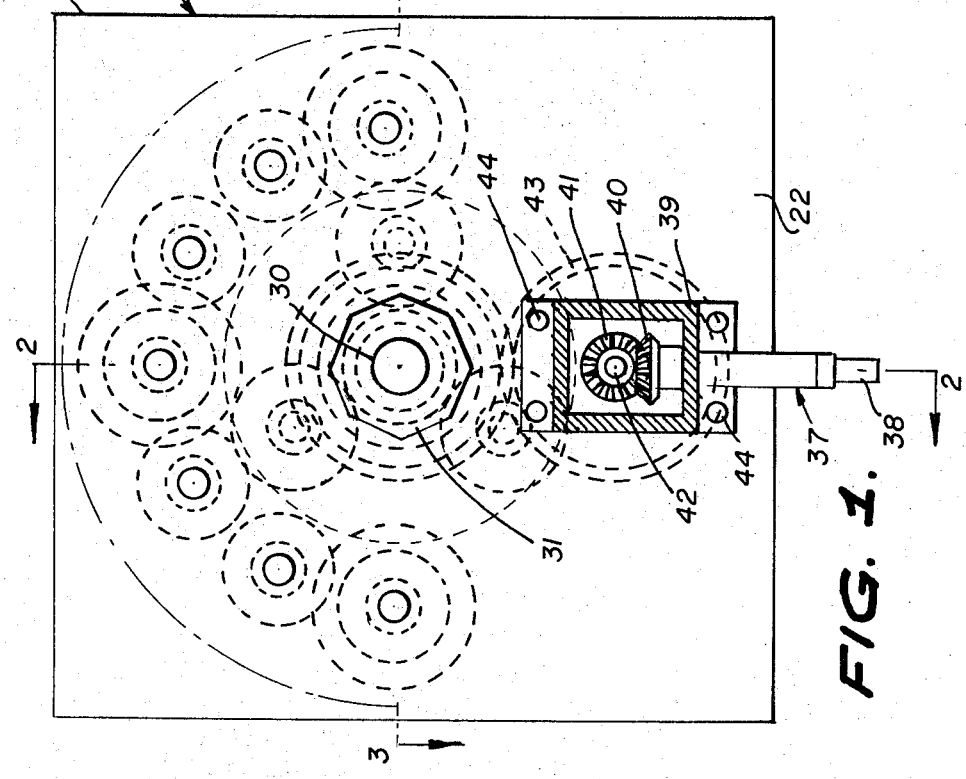

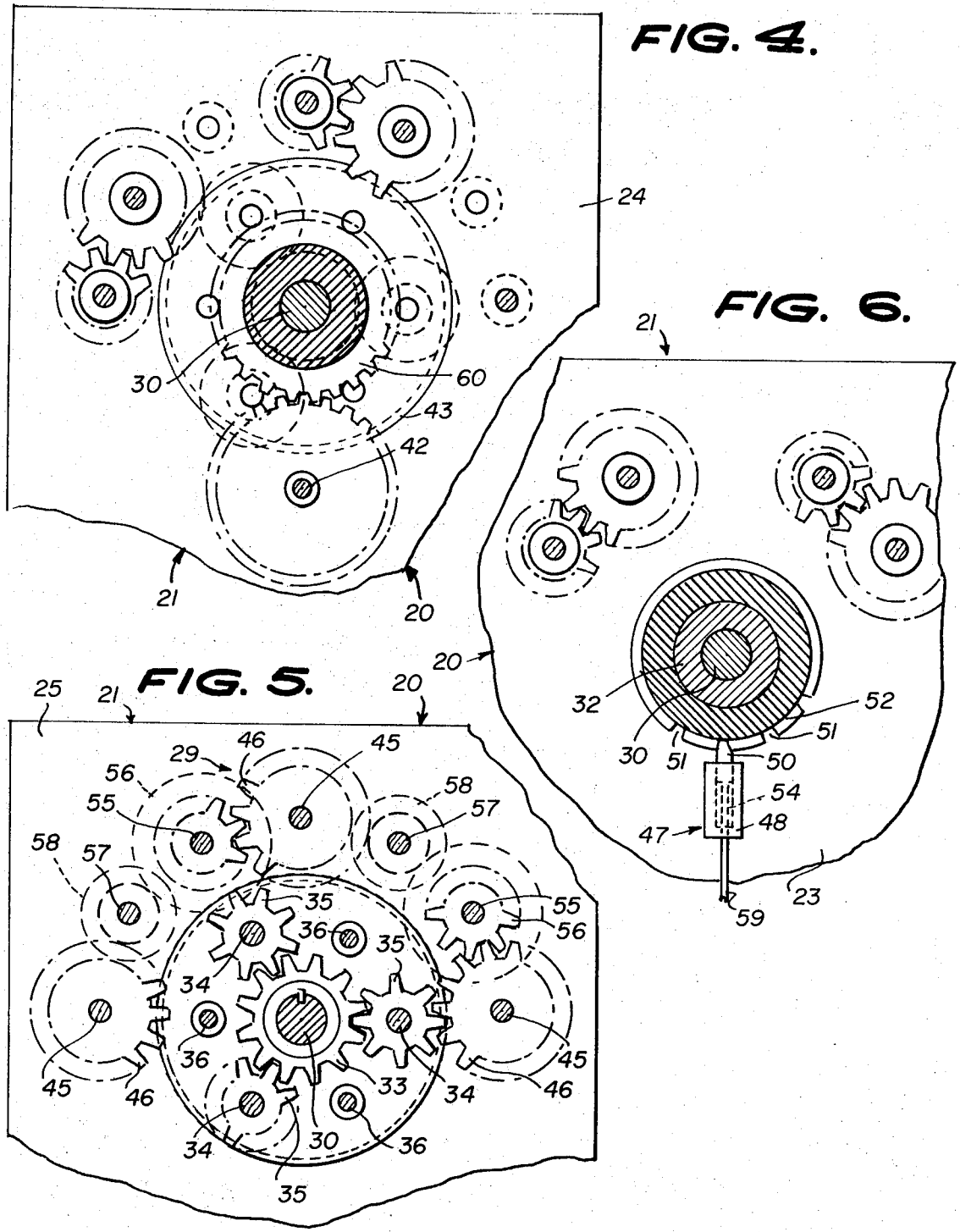

3,864,987

CHANGE SPEED GEARING

BACKGROUND OF THE INVENTION

FIELD OF THE INVENTION

The present invention relates to change speed gearing wherein power can be supplied to an input or drive shaft and wherein intermeshing gears operatively connect the drive shaft to output shaft means so that rotation can be provided for any desired purpose.

SUMMARY OF THE INVENTION

A change speed gearing that includes means for supplying power from a suitable power source to a drive shaft, and wherein there is provided adjustable intermeshing gears, as well as means for permitting other shaft means to be operatively driven by the drive shaft.

The present invention is an improvement over my prior U.S. Pat. No. 3,564,935 dated Feb. 23, 1971.

The primary object of the present invention is to provide an improved change speed gearing that includes an adjustable means whereby various gears can be driven in a desired manner to permit power to be taken off at different arrangements or locations, and wherein there is also provided a latching or locking means for maintaining the parts stationary in their adjusted position.

Another object of the present invention is to provide a change speed gearing that is ruggedly constructed and foolproof in use and which is relatively simple and inexpensive to manufacture.

Other objects and advantages will become apparent in the following specification when considered in the light of the attached drawings.

BRIEF DESCRIPTION OF THE DRAWINGS

FIG. 1 is an end elevational view of the change speed gearing of the present invention, with parts broken away and in section;

FIG. 2 is a sectional view taken on the line 2—2 of FIG. 1;

FIG. 3 is a sectional view taken on the line 3—3 of FIG. 1;

FIG. 4 is a sectional view taken on the line 4—4 of FIG. 2;

FIG. 5 is a sectional view taken on the line 5—5 of FIG. 2; and

FIG. 6 is a sectional view taken on the line 6—6 of FIG. 2.

DESCRIPTION OF THE PREFERRED EMBODIMENT

Referring now to the drawings in detail, the numeral 20 indicates the change speed gearing of the present invention that includes a casing or housing 21, FIG. 2, and the casing 21 includes spaced apart wall members 22 and 23 as well as spaced parallel divider plates 24 and 25 whereby there is defined within the casing 21 spaces 26, 27 and 28 for receiving parts of the gear train 29.

The numeral 30 indicates a centrally disposed input or drive shaft that is adapted to be connected to a suitable source of power, and sleeves 31 and 32 are mounted in the wall members 22 and 23, the shaft 30 being journaled in the sleeves 31 and 32. The numeral 33 indicates a first gear that is mounted on the central portion of the drive shaft 30 as shown in the drawings.

As shown in FIG. 5 first, second and third stub shafts 34 are journaled between the plates 24 and 25, and each of the stub shafts 34 has a pinion 35 thereon. The numeral 36 indicates shaft members that are arranged in spaced parallel relation with respect to each other, and the three shaft members 36 are arranged as shown in FIG. 5.

The numeral 37 indicates an adjusting means that comprises or embodies a manually operable crank 38 that has a hollow housing 39 associated therewith, and the housing 39 may be secured to the adjacent wall member 22 in any suitable manner, as for example by means of screws or securing elements 44, FIG. 2. A bevel gear 40 is suitably connected to an end of the crank 37 as shown in the drawings, and the bevel gear 40 has its teeth meshing with teeth 41 that form part of a bevel gear, and the toothed bevel gear member 41 is mounted on a shaft 42 that has a gear 43 thereon, and the gear element 43 is arranged as shown in FIG. 2 for example.

As shown in the drawings, first, second and third spaced parallel driven shafts are provided, and the plurality of driven shafts or output shafts 45 may be used for supplying power to any desired member. The numeral 46 indicates gear members that are mounted on the driven shafts 45.

There is further provided a latching or locking means for maintaining the parts stationary in their adjusted position, and this latching or locking means is indicated generally by the numeral 47 and the latching means 47 includes a base piece 48 that may be suitably secured to the inner surface of the wall 23 as for example by means of securing elements 49. The numeral 50 indicates a pawl or locking dog that is urged outwardly by a spring member 54, and the pawl 50 is mounted for sliding movement in the base piece 48, the outer end of the pawl 50 mounted for movement into and out of locking engagement with respect to grooves 51 in a gear section 52, FIG. 6. The numeral 53 indicates an end portion of the latching mechanism 47, and the end piece 53 can function as a handle whereby the latching mechanism can be conveniently manually actuated.

As shown in FIG. 5 there is further provided spaced parallel shaft elements 55 that have gears 56 thereon, and the shafts 57 have gears 58 mounted thereon.

In the drawings the numeral 59 indicates a portion of the crank arm for the latching mechanism 47.

The numeral 60 indicates a gear that is affixed to the sleeve 31 as shown in FIGS. 2 and 4, and the teeth of the gear element 43 mesh with the teeth of the gear 60.

From the foregoing, it will be seen that there has been provided a change speed gearing that is an improvement over prior devices such as the change speed gearing shown in prior U.S. Pat. 3,564,935 dated Feb. 23, 1971. In use, with the parts arranged as shown in the drawings the drive shaft 30 is adapted to be driven from a suitable power source such as a motor or the like, and as the shaft 30 is rotated or driven, the various gears of the gear train 29 will be actuated or moved so that power can be supplied to output shafts such as the shafts 45. It is to be understood that the work or force delivered by the output or driven shafts can be used for any desired purpose.

In addition, with the present invention there is provided a means for adjusting the position of various of the gears and shafts of the gear train so that the output-input speed of the respective driven and drive shafts can be modified or varied as desired. This means for varying the speed between the input and output shafts includes the mechanism 37. Thus, it will be seen that by rotating or moving the member 38 of the mechanism 37, the bevel gear 40 will be rotated and because the bevel gear 40 is in meshing engagement with the bevel gear 41, it will be seen that this will result in corresponding rotation of the shaft 42. The gear element 43 is suitably affixed to the shaft 42 in any suitable manner as for example by means of a key arrangement and with the teeth of the gear element 43 in meshing engagement with the teeth of the gear 60, it will be seen that this will result in rotation or movement of the gear 60.

As the gear 60 moves it will move the corresponding gears or elements of the gear train to a desired position so that the relative speed of the output shafts can be modified or varied as desired depending upon the amount of movement of the member 38 of the adjusting mechanism 37.

There is further provided a latching or locking mechanism for maintaining the parts stationary in their adjusted position, and this locking mechanism is indicated generally by the numeral 47. As shown in the drawings after the parts have been moved to their desired location, the element 59 can be actuated either manually or in any other manner, whereby the pawl or keeper 50 can selectively engage a notch 51 in the gear section 52. With the keeper 50 engaging a notch 51 in the gear section 52, the parts will be maintained stationary in their adjusted position. The spring member 54 serves to bias or urge the keeper 50 upwardly so as to prevent accidental movement of the parts from their adjusted position.

It is to be understood that the parts can be made of any suitable material and in different shapes or sizes as desired or required.

It will be seen that the mechanism 47 functions as a brake mechanism for the device. The miter and bevel gears are arranged as shown in the drawings. Also, the teeth of the various gears may be arranged or provided with a desired pitch as desired or required. The gear train includes various gears such as the bevel or worm gears.

With the present invention the change speed gearing arrangement provides for selectively modifying the output-input speed of the respective shafts. Thus, there is a mechanical drive arrangement that has a plurality of output drive members that are selectively driven from a single input drive member. The assembly such as that shown in FIG. 5 functions as a carrier to move the three pinions or gears 35, and the gears 35 are all locked on the shaft 30 by means of the gearing 33. Thus, as shown in FIG. 5 as a shaft turns in a direction such as a clockwise direction, a gear 35 selectively moves in or out of mesh with its corresponding adjacent gear member. Further movement of the gearing in such a direction will also cause gears such as gears 46 and 35 to mesh so that, for example a low speed drive can be provided. Shafts such as the shafts 45 are drive shafts, the low speed, for example will be provided because the gears will function as reducing gears all the way around. It is to be understood that a reverse action can be used to produce a high speed at the output. Thus, the movement of the gears such as the gear 60 will move the corresponding gears of the gear train to a desired position whereby the relative speed of the output shafts can be varied as desired or required.

Having thus described the preferred embodiment of the invention it should be understood that numerous structural modifications and adaptations may be resorted to without departing from the spirit of the invention.

What is claimed is:

1. In a change speed gearing, a casing including spaced parallel wall members, divider plates interposed between said wall members, an input drive shaft mounted in said casing, a pair of spaced apart sleeves mounted on said drive shaft, a plurality of output shafts journaled in said casing, and a gear train including coacting shafts and gears for selectively operatively connecting said drive shaft to said output shafts, and means for selectively modifying the output-input speed of the respective drive and output shafts.

2. A device as claimed in claim 1 and further including a locking mechanism providing a brake.

3. A device as claimed in claim 1 wherein the means for selectively modifying the output-input speed of the shafts comprises intermeshing bevel gears.

4. A device as claimed in claim 1 wherein the means for selectively modifying the output-input speed of the shafts comprises intermeshing bevel gears, and a crank for selectively rotating said gears.

5. A device as claimed in claim 1 and further including a locking braking means for the gear train.

6. A device as claimed in claim 1 and further including a locking braking means for the gear train, said locking braking means comprising a movable keeper for selectively engaging notches in a gear of the gear train.

7. A device as claimed in claim 1 and further including a locking braking means that includes a movable keeper that is mounted for movement into and out of engagement with notches in a gear of the gear train, and resilient means for normally urging and biasing the keeper into engagement with notches of the respective adjacent gear.

* * * * *